United States Patent [19]
Hsu

[11] Patent Number: 6,082,352
[45] Date of Patent: Jul. 4, 2000

[54] OVEN DOOR HINGE

[75] Inventor: Tony Hsu, Yung Kang, Taiwan

[73] Assignee: Lundar Electric Industrial Co., Ltd., Tainan Hsien, Taiwan

[21] Appl. No.: 09/334,673

[22] Filed: Jun. 17, 1999

[51] Int. Cl.[7] .............................. F23M 7/00; E05D 7/10; E06B 3/34
[52] U.S. Cl. ....................... 126/194; 126/41 R; 126/190; 16/257; 16/259; 16/270; 49/41; 49/382; 49/261
[58] Field of Search .................................. 126/194, 41 R, 126/190; 16/257, 259, 270; 49/41, 382, 261

[56] References Cited

U.S. PATENT DOCUMENTS

| | | | |
|---|---|---|---|
| 429,684 | 6/1890 | Hall | 16/257 |
| 1,475,838 | 11/1923 | Lamb | 126/194 |
| 2,539,151 | 1/1951 | Mills | 126/194 |
| 3,045,663 | 7/1962 | McDonnold | 126/190 |
| 3,756,219 | 9/1973 | Snyder et al. | 126/194 |
| 3,852,943 | 12/1974 | Healy | 16/257 |
| 4,269,165 | 5/1981 | Wrotny et al. | 126/194 |
| 4,667,367 | 5/1987 | White et al. | 16/270 |
| 4,799,291 | 1/1989 | Ankum et al. | 16/259 |
| 4,873,745 | 10/1989 | Ramsauer | 16/259 |
| 5,274,881 | 1/1994 | DeRosa | 16/257 |
| 5,738,179 | 4/1998 | Matsui | 16/357 |

FOREIGN PATENT DOCUMENTS

| | | | |
|---|---|---|---|
| 0515329 | 8/1954 | Belgium | 16/270 |

*Primary Examiner*—Ira S. Lazarus
*Assistant Examiner*—David Lee
*Attorney, Agent, or Firm*—Rosenberg, Klein & Lee

[57] ABSTRACT

An oven door hinge comprises a pair of engaging devices at respective sides of the door, having a recess at the middle of each engaging device. A plural lugs are formed inside of the door for receiving covers to form a gap. The top portion of the engaging device has a through hole for receiving a connecting unit. The connecting unit has a pin extending through a spring and into the gap of the door with a portion extending into the recess. The oven has a pair of posts extending from respective sides thereof. When mounting the door onto the oven, the pin is urged by the spring to retract so that the door may be moved to the gap and the recesses of the engaging devices will be engaged with the posts, respectively, and the pin extends into the recesses to secure the door on the oven.

3 Claims, 5 Drawing Sheets

OVEN DOOR HINGE

BACKGROUND OF THE INVENTION

1. Filed of the Invention

This invention relates to an oven door hinge, and more particularly to a door with a spring pin engaged to a pair of lugs at respect sides for mounting and dismounting quickly and easily.

2. Prior Art

The conventional ovens on the market are mostly hinged to one side of the ovens which make it difficult to place food inside and to pick up foods from within, and to dismount the door for cleaning. Further, the door is secured to the oven itself; therefore, its function and re-configurability for other purposes are.

SUMMARY OF THE INVENTION

It is the primary object of the present invention to provide an oven door hinge which comprises a pair of engaging devices at respective sides of the door each having a recess at its middle portion. A plurality of lugs are formed inside of the door for receiving covers thereat to form a gap. The top portion of the engaging device has a through hole for securing a connecting unit. The connecting unit has a pin engaging a spring and passing through the gap of the door with a portion extending into the recess. The oven has a pair of posts extending from respective sides thereof, thus when mounting the door onto the oven, each pin is may be retraded against the spring's bias so that the door may be moved, and the recesses of the engaging devices may engage the posts, respectively. Thereafter, each pin is permitted to extend back into the corresponding recess so as to secure the door on the oven.

It is another object of the present invention to provide an oven door which is detachably attached to the oven and is easy to maintain.

DETAILED DESCRIPTION OF THE PREFERRED EMBODIMENTS

Figure 1:
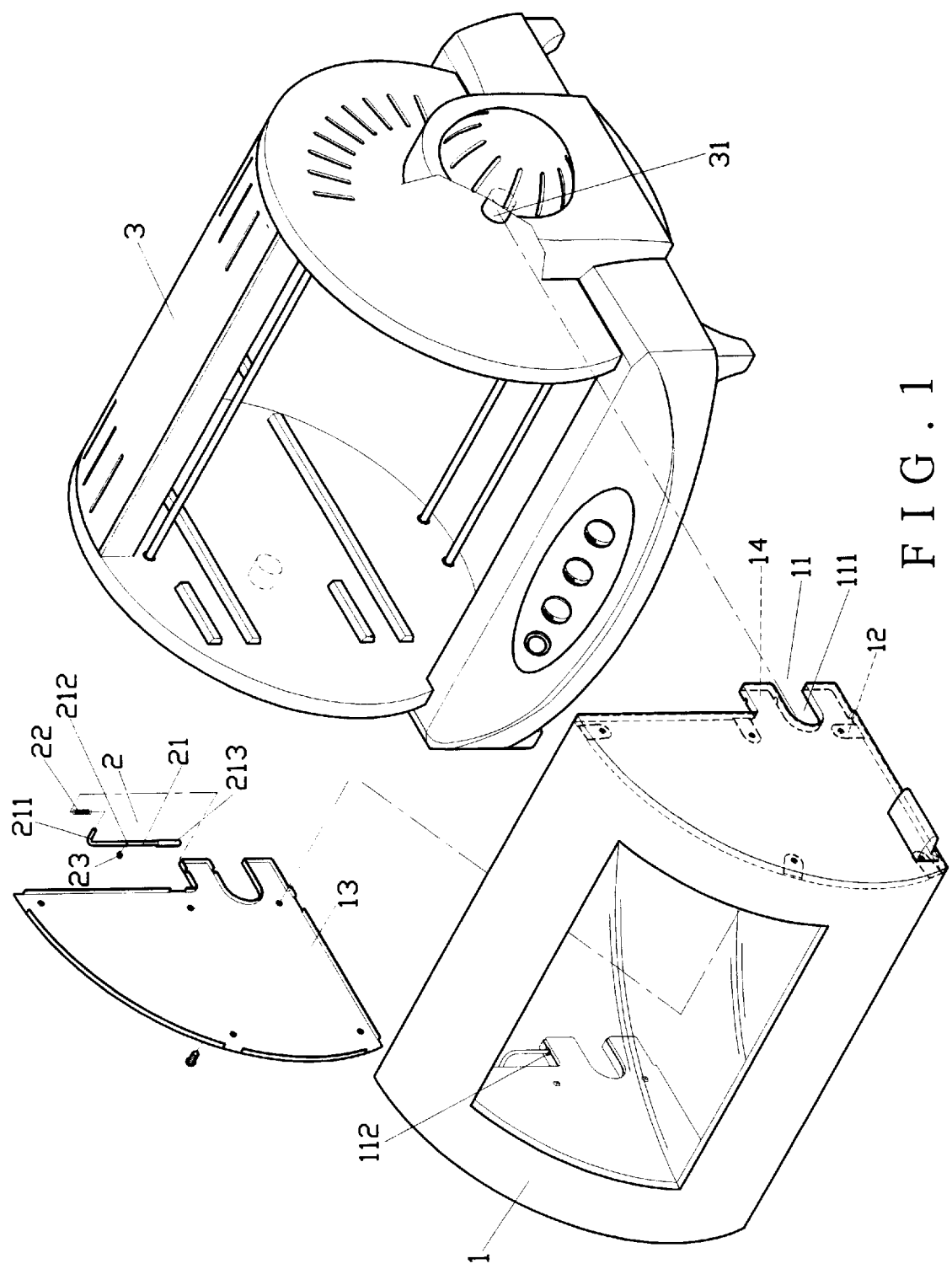
FIG. 1 is an exploded view of the present invention.
Figure 2:
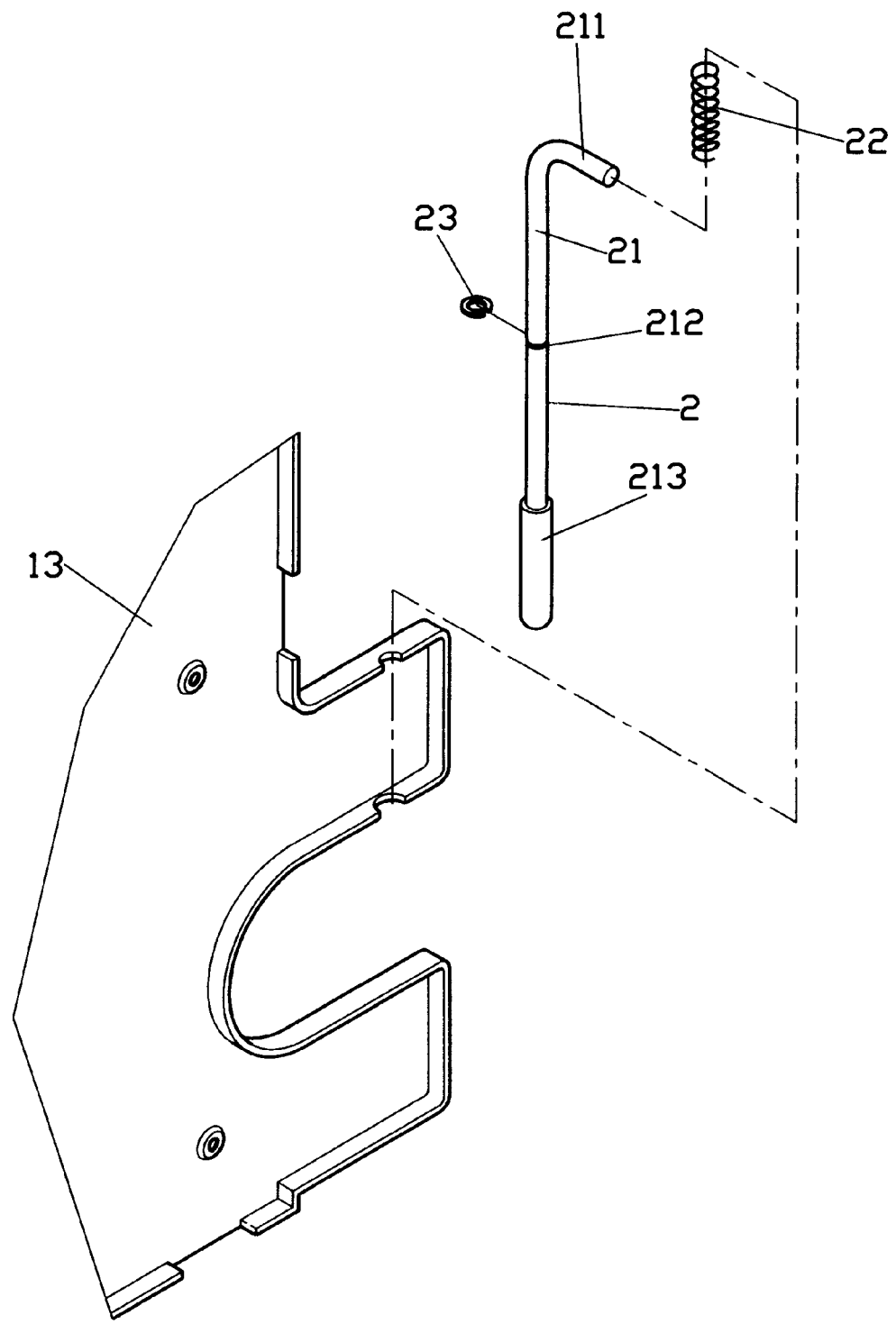
FIG. 2 is an enlarged and exploded view of the engaging device and the connecting unit of the present invention.

The oven door hinge of the present invention, as shown in FIGS. 1 and 2, comprises a door 1, two connecting units 2 (only one shown in FIGS. 1 and 2) and an oven 3.

The door 1 is in an arcade shape with a cavity inside, and has two engaging devices 11 at respective sides. Each engaging device 11 comprises a recess 111 at the middle portion thereof. A plurality of lugs 12 are formed at respect sides of the door 1 for receiving covers 13 in such manner as to form gaps 14. The top portion of each engaging device 11 has a through hole 112 for receiving a connecting unit 2.

The connecting unit 2 has a pin 21, a spring 22 and a retaining ring 23. One end of the pin 21 bends to form a handle 21 1, and the other end of the pin 21 has formed thereon a stopper 213. The pin 21 also has a trough 212 engaged by the retaining ring 23.

The oven 3 has extending therefrom a pair of posts 31 corresponding to the recesses 111 of the engaging devices 11 of the door 1.

Figure 3:
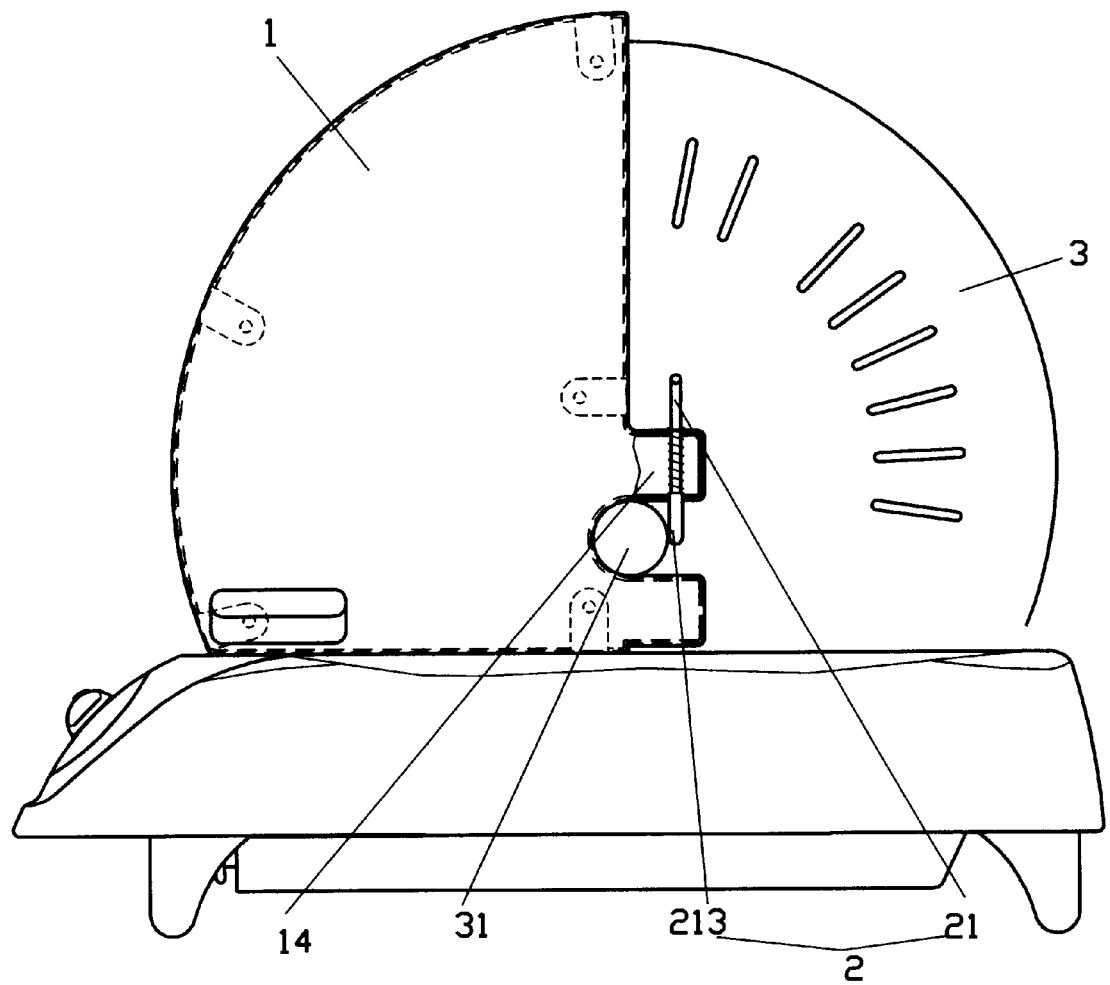
FIG. 3 is a side elevation view of the present invention.
Figure 4:
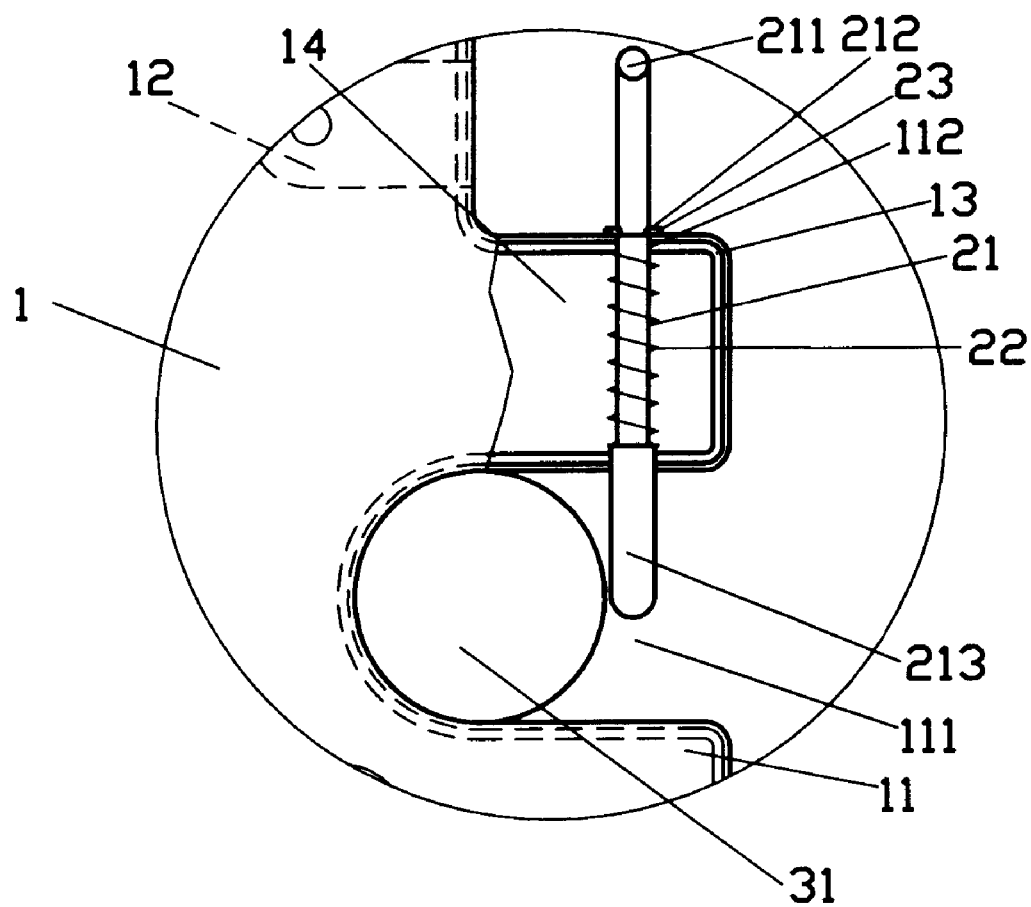
FIG. 4 is an enlarged view of the engaging device and the connecting unit showing the door in an engaging state.
Figure 5:
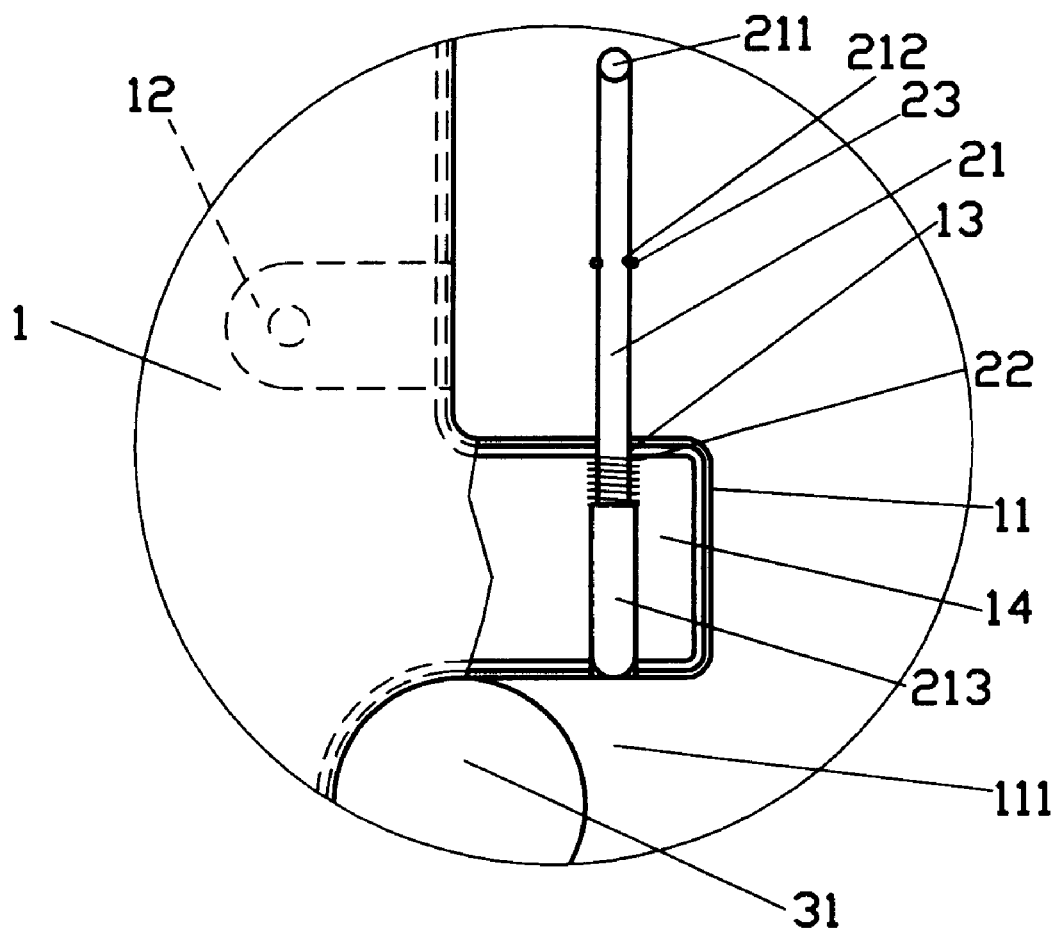
FIG. 5 is another enlarged view of the engaging device and the connecting unit showing the door in a releasing state.

When assembled, referring to FIGS. 3 and 4, the pins 21 insert through respective springs 22 and seat in the gaps 14 of the engaging devices 11 of the door 1. The retaining ring 23 is engaged with the pin 21 to prevent slip. At this point, the pin 21 is extending partially into the recess 111 of the engaging device 11. When the door 1 is secured to the oven 3, as shown to FIG. 5, and the handle 211 of the pin 21 of the oven 1 is pulled, the pulled pin 21 has its stopper 213 urging the spring 22 to compress so that the stopper 213 is corresponding into the gap 14 of the engaging device 11. The recesses 111 at respect sides of the door 1 are thereby rendered free to disengage from the corresponding posts 31 of the oven 3. When the pin 21 is released, the restoring force of the spring 22 will urge the pin 21 to extend into the recess 111, to engage to the post 31 to secure the door 1 onto the oven 3.

When the oven 3 requires cleaning, the handle 211 of the pin 21 is pulled, such that the stopper 213 retracts into the gap 14 so that the door 1 may easily be disassembled.

I claim:

1. A door assembly for an appliance having a pair of opposed posts protruding therefrom along an assembly axis comprising:

(a) a door coupled to the posts in pivotally displaceable manner substantially about the assembly axis, said door having a pair of spaced side members, each said side member having protruding therefrom at least a pair of engaging device portion defining a recess therebetween, each said recess engaging at least one post, at least one said engaging device portion having formed therein an inner gap chamber; and, (b) a pair of connecting units respectively coupled to said side members of said door, each said connecting unit including a longitudinally extended pin member passing displaceably through at least one said engaging device for displacement between first and second positions, said pin member being spring biased to said first position, said pin member having formed thereon a stopper portion;

said stopper portion of said pin member thereby extending, in said first portion, into said side member recess for capturing the post engaged thereto, and being substantially withdrawn from said side member recess, in said second position, for releasing the post for disengagement.

2. The door assembly as recited in claim 1 wherein said spring member of each said connecting unit is coupled in substantially coaxial manner to said pin member and captured within said inner gap chamber of said engaging device for biasing said pin member to said first position.

3. The door assembly as recited in claim 2 wherein each said side member of said door includes:

(a) a side wall portion having a plurality of lugs extending therefrom; and, (b) a cover coupled to said lugs, said cover having a planar portion disposed in spaced manner from said sidewall portion, said inner gap chamber of said side member engaging device portion being disposed between said spaced planar and sidewall portions.

* * * * *